United States Patent
Arimilli et al.

(10) Patent No.: US 8,024,527 B2
(45) Date of Patent: Sep. 20, 2011

(54) PARTIAL CACHE LINE ACCESSES BASED ON MEMORY ACCESS PATTERNS

(75) Inventors: Lakshminarayana B. Arimilli, Austin, TX (US); Ravi K. Arimilli, Austin, TX (US); Jerry D. Lewis, Round Rock, TX (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 12/024,432

(22) Filed: Feb. 1, 2008

(65) Prior Publication Data

US 2009/0198960 A1 Aug. 6, 2009

(51) Int. Cl.
G06F 12/04 (2006.01)
(52) U.S. Cl. ........... 711/146; 711/E12.01; 711/E12.021; 711/154
(58) Field of Classification Search .................. 711/146, 711/E12.01, E12.021, 154
See application file for complete search history.

(56) References Cited

U.S. PATENT DOCUMENTS

| | | | |
|---|---|---|---|
| 4,694,395 A | 9/1987 | Young et al. | |
| 5,555,391 A | 9/1996 | De Subijana et al. | |
| 5,802,572 A | 9/1998 | Patel et al. | |
| 5,893,151 A | 4/1999 | Merchant | |
| 5,926,829 A * | 7/1999 | Hagersten et al. | ............ 711/120 |
| 6,199,107 B1 | 3/2001 | Dujari | |
| 6,345,342 B1 | 2/2002 | Arimilli et al. | |
| 6,353,877 B1 | 3/2002 | Duncan et al. | |
| 6,499,085 B2 | 12/2002 | Bogin et al. | |
| 6,564,302 B1 | 5/2003 | Yagi et al. | |
| 6,571,322 B2 | 5/2003 | Arimilli et al. | |
| 6,615,321 B2 | 9/2003 | Arimilli et al. | |
| 6,763,433 B1 * | 7/2004 | Arimilli et al. | ............ 711/146 |
| 6,763,434 B2 | 7/2004 | Arimilli et al. | |
| 6,848,071 B2 | 1/2005 | Chaudhry et al. | |
| 6,971,000 B1 | 11/2005 | Sinharoy et al. | |
| 6,978,351 B2 | 12/2005 | Osbourne et al. | |
| 7,062,609 B1 | 6/2006 | Trehus et al. | |
| 7,065,548 B2 | 6/2006 | Van Oldenborgh et al. | |
| 7,600,143 B1 * | 10/2009 | Neuman | ........................ 713/500 |
| 2002/0087801 A1 * | 7/2002 | Bogin et al. | ................... 711/137 |
| 2002/0087809 A1 * | 7/2002 | Arimilli et al. | ............... 711/144 |
| 2002/0092029 A1 | 7/2002 | Smith | |
| 2002/0138698 A1 | 9/2002 | Kalla | |

(Continued)

OTHER PUBLICATIONS

Hwang et al.; "Delayed Precise Invalidation a Software Cache Coherence Scheme"; IEEE Proceeding Computer and Digital Techniques; vol. 143, No. 5, pp. 337-344; Sep. 1996.

(Continued)

*Primary Examiner* — Matt Kim
*Assistant Examiner* — Hal Schnee
(74) *Attorney, Agent, or Firm* — Dillon & Yudell LLP

(57) ABSTRACT

According to a method of data processing in a multiprocessor data processing system, in response to a processor request to read a target granule of a target cache line of data containing multiple granules, a processing unit originates on an interconnect of the multiprocessor data processing system a partial read request that requests permission to read only the target granule of the target cache line. In response to a combined response to the partial read request indicating success, the combined response representing a system-wide response to the partial read request, the processing unit receives the target granule of the target cache line, supplies the target granule to a requesting processor core, and updates a coherency state of the target granule while retaining a coherency state of at least one other granule of the target cache line.

20 Claims, 10 Drawing Sheets

U.S. PATENT DOCUMENTS

| | | | | |
|---|---|---|---|---|
| 2002/0174253 | A1* | 11/2002 | Hayter et al. | 709/250 |
| 2003/0110117 | A1 | 6/2003 | Saidenberg et al. | |
| 2003/0159005 | A1* | 8/2003 | Augsburg et al. | 711/146 |
| 2004/0037276 | A1 | 2/2004 | Henderson et al. | |
| 2004/0039879 | A1 | 2/2004 | Gaither | |
| 2004/0049615 | A1 | 3/2004 | Liang | |
| 2005/0027911 | A1 | 2/2005 | Hayter et al. | |
| 2005/0053057 | A1 | 3/2005 | Deneroff et al. | |
| 2005/0204113 | A1* | 9/2005 | Harper et al. | 711/170 |
| 2005/0240729 | A1 | 10/2005 | Van Berkel et al. | |
| 2005/0240736 | A1 | 10/2005 | Shaw | |
| 2006/0173851 | A1 | 8/2006 | Singh et al. | |
| 2006/0179254 | A1* | 8/2006 | Clark et al. | 711/146 |
| 2006/0184607 | A1 | 8/2006 | Le Leannec et al. | |
| 2006/0184746 | A1* | 8/2006 | Guthrie et al. | 711/146 |
| 2006/0251092 | A1 | 11/2006 | Matterne et al. | |
| 2007/0038846 | A1 | 2/2007 | Kadambi et al. | |
| 2007/0050592 | A1 | 3/2007 | Gschwind et al. | |
| 2007/0058531 | A1 | 3/2007 | Dierks et al. | |
| 2007/0136374 | A1 | 6/2007 | Guedalia | |
| 2007/0168619 | A1 | 7/2007 | Hutton et al. | |
| 2007/0294264 | A1 | 12/2007 | Bayardo, Jr. et al. | |
| 2008/0104330 | A1* | 5/2008 | Deshpande | 711/141 |
| 2008/0183972 | A1* | 7/2008 | Dieffenderfer | 711/146 |
| 2009/0198865 | A1 | 8/2009 | Arimilli et al. | |
| 2009/0198912 | A1 | 8/2009 | Arimilli et al. | |
| 2009/0198914 | A1 | 8/2009 | Arimilli et al. | |

OTHER PUBLICATIONS

Gilbert et al.; "Distributed Data Cache Designs for Clustered VLIW Processors"; IEEE Transactions on Computers; vol. 54, No. 10, pp. 12227-1241; Oct. 2005.

Guo et al.; "Cooperative Caching for Peer Assisted Video Distribution"; Advances in Multimedia Modeling, 13th International Multimedia Modeling Conference; MMM 2007; Lecture Notes in Computer Science; vol. 4351; pp. 135-144.

Emma et al.; "Partial Store Lines in Store in Caches"; IBM TDB; p. 4240; Dec. 1984.

J. Hoogerbrugge; "Cost Efficient Branch Target Buffers" Euro-Par 2004 Parallel Processing; 10th International Euro-Par Conference; Lecture Notes in Computer Science; vol. 1900; pp. 950-959; Aug.-Sep. 2000.

Parmentier et al.; Cache Based Parallelization of Multiple Sequence Alignment Problem; Euro-Par Parallel Processing; 10th International Euro-Par Conference; Lecture Notes in Computer Science; vol. 3149; pp. 950-959.

Schnee, H.—Office Action dated Sep. 28, 2010; U.S. Appl. No. 12/024,447.

Schnee, H.—Office Action dated Sep. 28, 2010; U.S. Appl. No. 12/024,424.

Schnee, H.—Office Action dated Oct. 13, 2010; U.S. Appl. No. 12/024,467.

L.B. Arimilli—Office Action dated Jan. 12, 2011; U.S. Appl. No. 12/024,392.

Ravi K. Arimilli—Office Action dated Jan. 20, 2011; U.S. Appl. No. 12/024,174.

L.B. Arimilli—Office Action dated Feb. 7, 2011; U.S. Appl. No. 12/024,467.

L.B. Arimilli-Office Action dated May 17, 2011; U.S. Appl. No. 12/024,467.

* cited by examiner

US 8,024,527 B2

PARTIAL CACHE LINE ACCESSES BASED ON MEMORY ACCESS PATTERNS

This invention was made with United States Government support under Agreement No. HR0011-07-9-0002 awarded by DARPA. The Government has certain rights in the invention.

BACKGROUND OF THE INVENTION

1. Technical Field

The present invention relates in general to data processing and, in particular, coherency management and interconnect operations for partial cache lines of data within a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the SMP computer system and which generally is accessible for read and write access by all processing units. In order to reduce access latency to instructions and data residing in the system memory, each processing unit is typically further supported by a respective multi-level cache memory hierarchy, the lower level(s) of which may be shared by one or more processor cores.

Data in a conventional SMP computer system is frequently accessed and managed as a "cache line," which refers to a set of bytes that are stored together in an entry of a cache memory and that may be referenced utilizing a single address. The cache line size may, but does not necessarily correspond to the size of memory blocks employed by the system memory. The present invention appreciates that memory accesses in a conventional SMP data processing system, which access an entire cache line, can lead to system inefficiencies, including significant traffic on the system interconnect and undesirable cross-invalidation of cached data.

SUMMARY OF THE INVENTION

According to a method of data processing in a multiprocessor data processing system, in response to a processor request to read a target granule of a target cache line of data containing multiple granules, a processing unit originates on an interconnect of the multiprocessor data processing system a partial read request that requests permission to read only the target granule of the target cache line. In response to a combined response to the partial read request indicating success, the combined response representing a system-wide response to the partial read request, the processing unit receives the target granule of the target cache line, supplies the target granule to a requesting processor core, and updates a coherency state of the target granule while retaining a coherency state of at least one other granule of the target cache line.

DETAILED DESCRIPTION OF ILLUSTRATIVE EMBODIMENT

Figure 1:
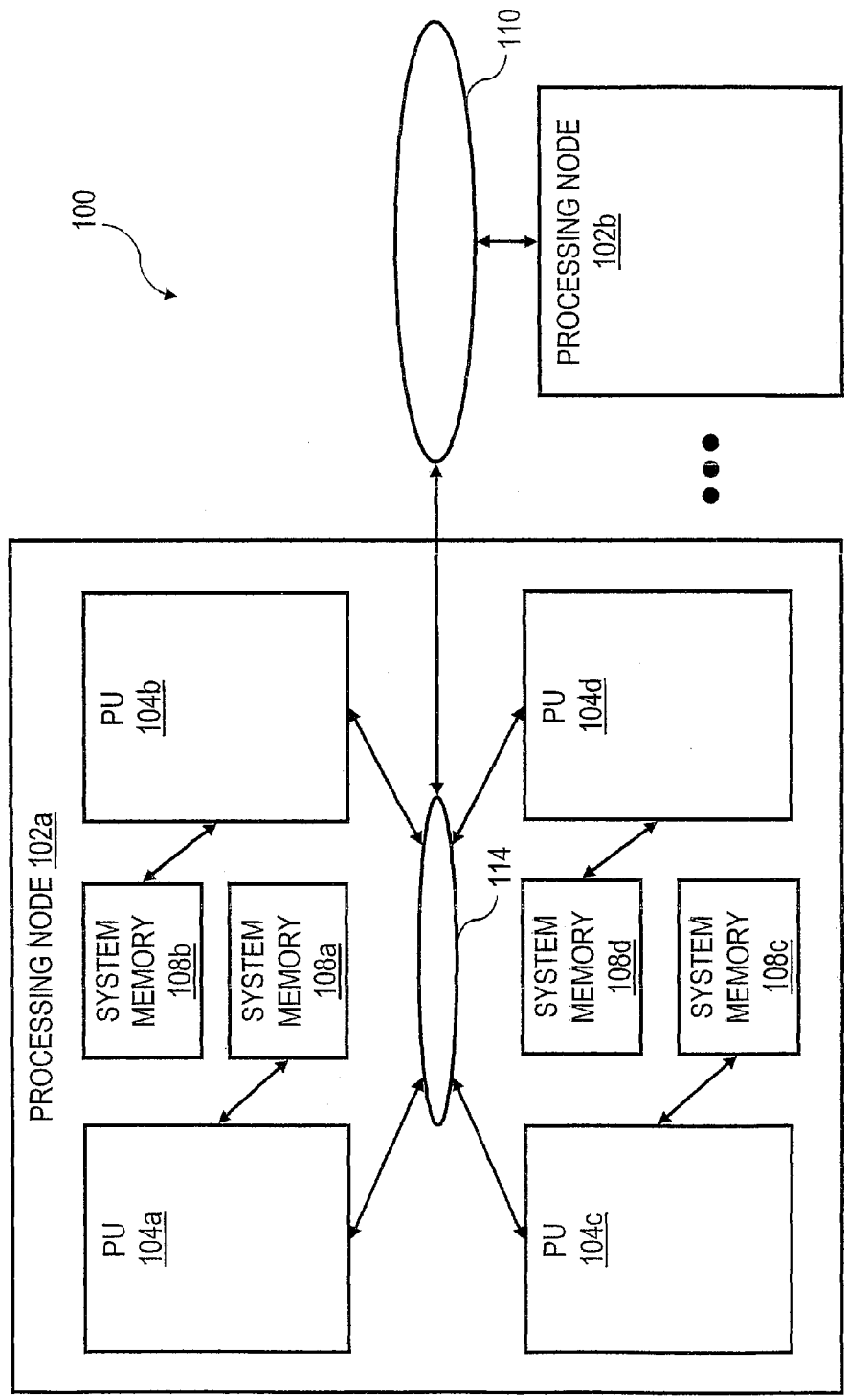
FIG. 1 is a high level block diagram of a multiprocessor data processing system in accordance with the present invention.

With reference now to the figures and, in particular, with reference to FIG. 1, there is illustrated a high level block diagram of an exemplary embodiment of a multiprocessor data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core 200 (FIG. 2) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2:
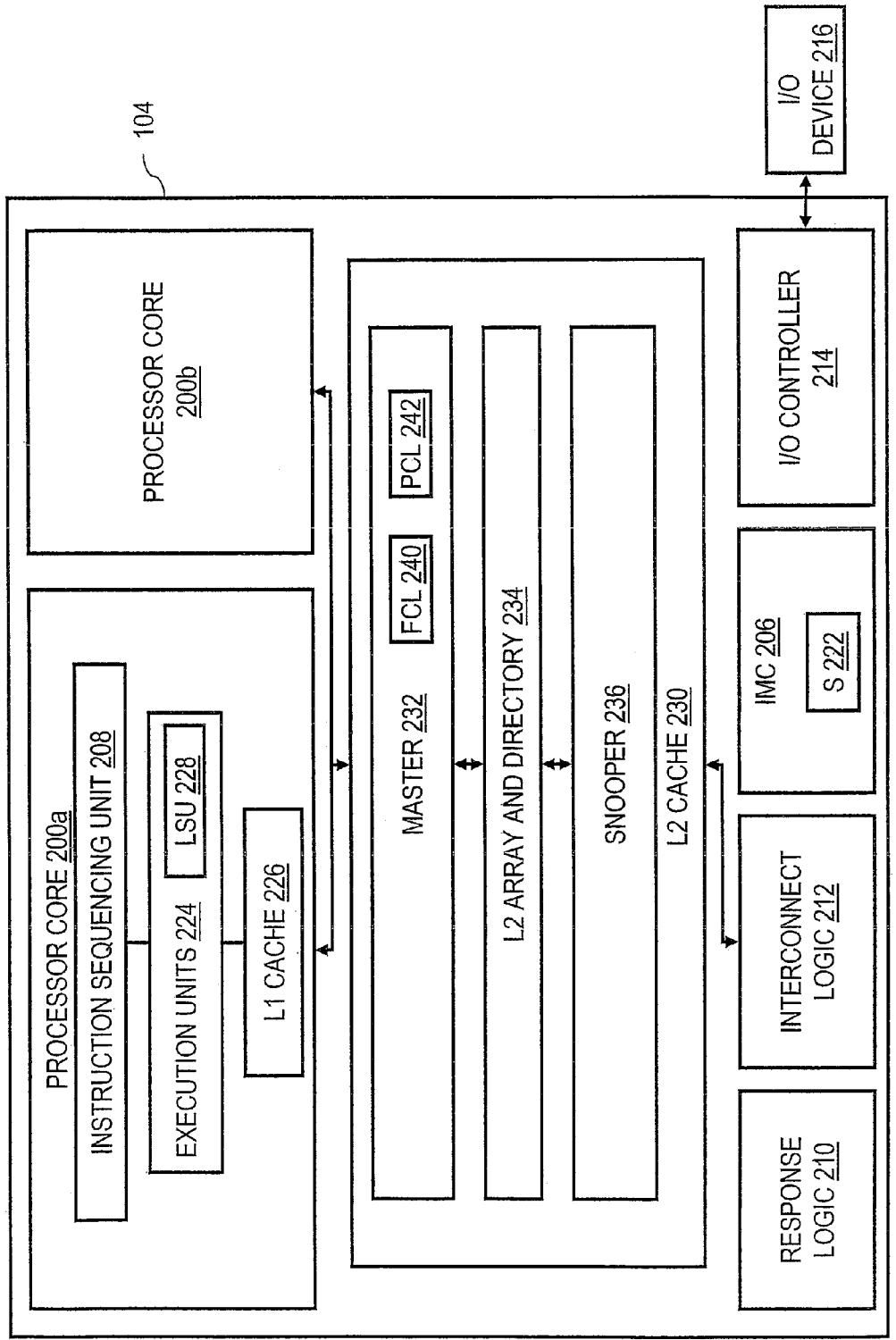
FIG. 2 is a high level block diagram of an exemplary processing unit in the multiprocessor data processing system of FIG. 1.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. The instructions executed by execution units 224 include instructions that request access to a memory block or cause the generation of a request for access to a memory block, and execution units 224 include a load-store unit (LSU) 228 that executes memory access instructions (e.g., storage-modifying and non-storage-modifying instructions).

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by a snooper (S) 222 on the local interconnect 114.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234, as well as a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations. The cache controller comprising master 232 and snooper 236 implements a method of hardware dynamic detection of partial store operations discussed in more detail herein in conjunction with FIG. 8.

Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an instance of response logic 210, which as discussed further below, implements a portion of the distributed coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
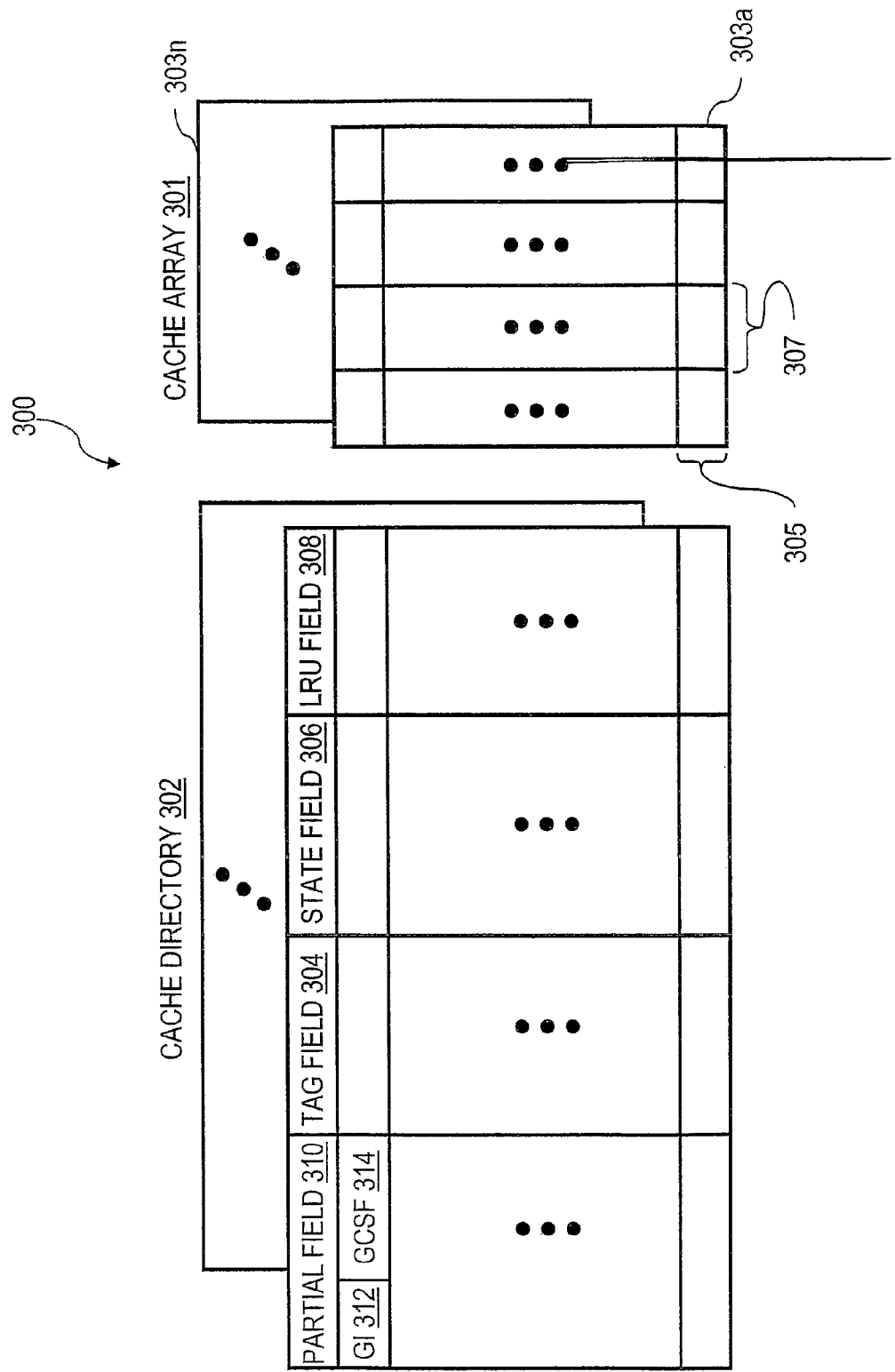
FIG. 3 is a more detailed block diagram of a cache array and directory in accordance with the present invention.

With reference now to FIG. 3, there is illustrated a more detailed block diagram of an exemplary embodiment of a cache array and directory 300, which may be utilized, for example, to implement the cache array and directory of an L1 cache 226 or L2 cache array and directory 234. As illustrated, cache array and directory 300 includes a set associative cache array 301 including multiple ways 303a-303n. Each way 303 includes multiple entries 305, which in the depicted embodiment each provide temporary storage for up to a full memory block of data, e.g., 128 bytes. Each cache line or memory block of data is logically formed of multiple granules 307 (in this example, four granules of 32 bytes each) that may correspond in size, for example, to the smallest allowable access to system memories 108a-108d. In accordance with the present invention, granules 307 may be individually accessed and cached in cache array 301.

Cache array and directory 300 also includes a cache directory 302 of the contents of cache array 301. As in conventional set associative caches, memory locations in system memories 108 are mapped to particular congruence classes within cache arrays 301 utilizing predetermined index bits within the system memory (real) addresses. The particular cache lines stored within cache array 301 are recorded in cache directory 302, which contains one directory entry for each cache line in cache array 301. As understood by those skilled in the art, each directory entry in cache directory 302 comprises at least a tag field 304, which specifies the particular cache line stored in cache array 300 utilizing a tag portion of the corresponding real address, a LRU (Least Recently Used) field 308 indicating a replacement order for the cache line with respect to other cache lines in the same congruence class, and a line coherency state field 306, which indicates the coherency state of the cache line.

In at least some embodiments, cache directory 302 further includes a partial field 310, which in the depicted embodiment includes granule identifier (GI) 312 and granule coherency state field (GCSF) 314. Partial field 310 supports caching of partial cache lines in cache array 301 and appropriate coherency management by identifying with granule identifier 312 which granule(s) of the cache line is/are associated with the coherency state indicated by granule coherency state field 314. For example, GI 312 may identify a particular granule utilizing $2^n$ bits (where n is the total number of granules 307 per cache line) or may identify one or more granules utilizing a one-hot or multi-hot encoding (or some other alternative encoding).

Coherency states that may be utilized in line coherency state field 306 and granule coherency state field 314 to indicate state information may be defined by the well-known MESI coherency protocol or a variant thereof. An exemplary variant of the MESI protocol that may be employed is described in detail in U.S. patent application Ser. No. 11/055,305, which is incorporated herein by reference. In some embodiments, when GI 312 indicates that fewer than all granules of a cache line are held in the associated entry 305 of cache array 301, granule coherency state field 314 indicates a special "Partial" coherency state that indicates that less than the complete cache line is held by cache array 301. For coherency management purposes, a Partial coherency state, if implemented, functions as a shared coherency state, in that data from such a cache line can be read freely, but cannot be modified without notification to other L2 cache memories 230 that may hold one or more granules 307 of the same cache line.

It should be appreciated that although partial field 310 is illustrated as part of cache directory 302, the information in partial field 310 could alternatively be maintained in separate directory structure to achieve lower latency access and/or other architectural considerations.

Figure 4:
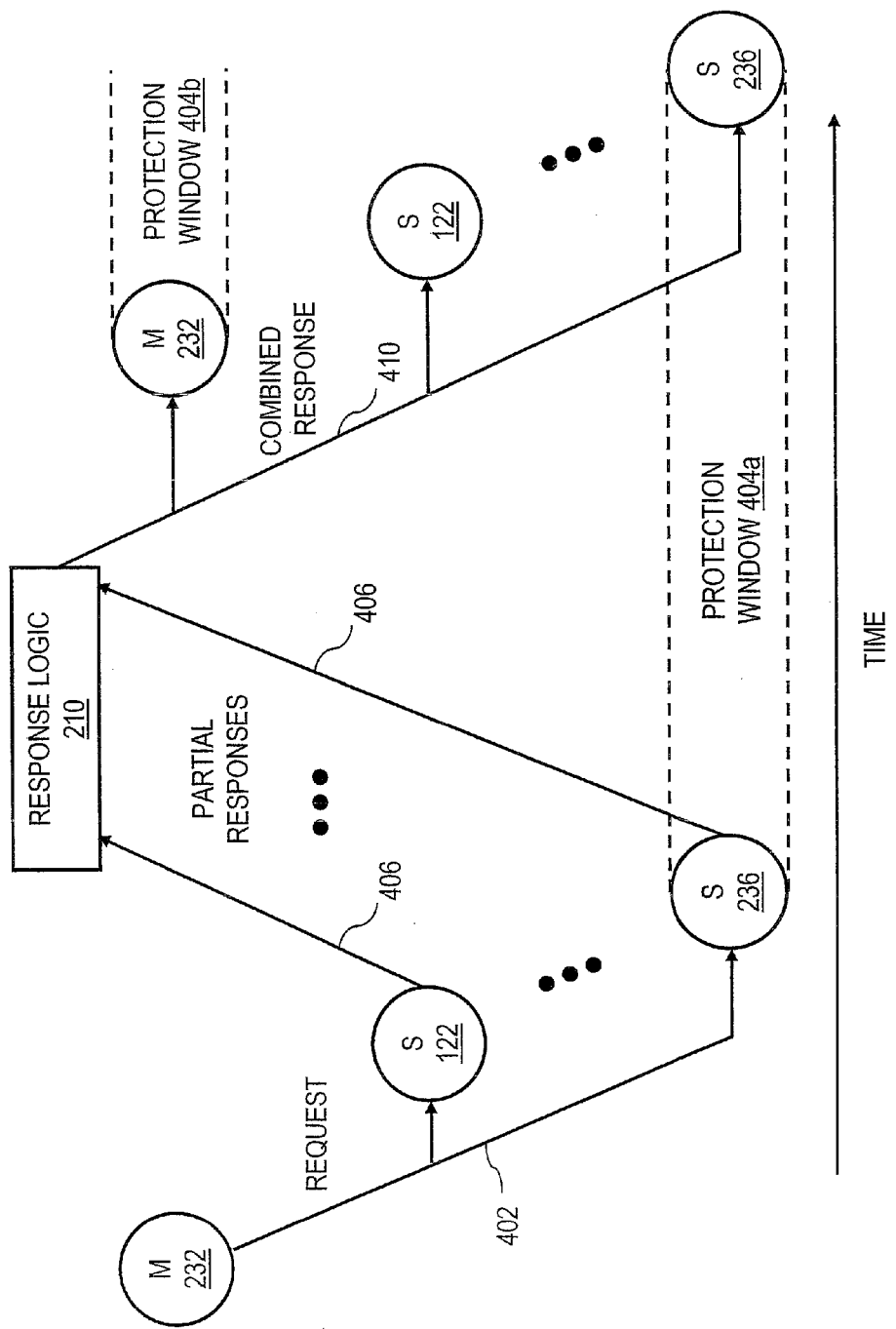
FIG. 4 is a time-space diagram of an exemplary operation within the multiprocessor data processing system of FIG. 1.

Referring now to FIG. 4, there is depicted a time-space diagram of an exemplary interconnect operation on a local or system interconnect 110, 114 of data processing system 100 of FIG. 1. The interconnect operation begins when a master 232 of an L2 cache 230 (or another master, such as an I/O controller 214) issues a request 402 of the interconnect operation on a local interconnect 114 and/or system interconnect 110. Request 402 preferably includes at least a transaction type indicating a type of desired access and a resource identifier (e.g., real address) indicating a resource to be accessed by the request. Conventional types of requests that may be issued on interconnects 114, 110 include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |

As described further below with reference to FIG. 8, conventional requests such as those listed in Table I are augmented according to the present invention by one or more additional memory access request types that target partial rather than full memory blocks of data.

Request 402 is received by the snooper 236 of L2 caches 230, as well as the snoopers 222 of memory controllers 206 (FIG. 2). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104. Each snooper 222, 236 that receives request 402 provides a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to any scope restrictions, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" operations invalidating the requested memory block in one or more L2 caches 230 are required.

In response to receipt of combined response 410, one or more of master 232 and snoopers 222, 236 typically perform one or more operations in order to service request 402. These operations may include supplying data to master 232, invalidating or otherwise updating the coherency state of data cached in one or more L2 caches 230, performing castout operations, writing back data to a system memory 108, etc. If required by request 402, a requested or target memory block may be transmitted to or from master 232 before or after the generation of combined response 410 by response logic 210.

In the following description, partial response of a snooper 222, 236 to a request and the operations performed the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block (or a granule 307 thereof). Descriptively, the HPC may also provide a copy of the memory block to a requester in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230.

Still referring to FIG. 4, in at least some embodiments, the HPC, if any, for a memory block referenced in a request 402, or in the absence of an HPC, the LPC of the memory block, has the responsibility of protecting the transfer of coherency ownership of a memory block in response to a request 402 during a protection window 404a. In the exemplary scenario shown in FIG. 4, the snooper 236 that is the HPC for the memory block specified by the request address of request 402 protects the transfer of coherency ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling an inability to service the request due to absence of a required resource.

The present invention appreciates that, for at least some workloads, data processing system efficiency can be increased by utilizing "partial" memory access requests that target less than a full cache line of data (e.g., a specified target granule of a cache line of data). For example, if memory access requests occasioned by storage-modifying instructions can be tailored to target a specific granule of interest in a target cache line, the amount of cached data subject to cross-invalidation as a consequence of the storage-modifying instructions is reduced. As a result, the percentage of memory access requests that can be serviced from local cache increases (lowering average memory access latency) and fewer memory access requests are required to be issued on the interconnects (reducing contention).

To facilitate utilization of partial memory access operations, various embodiments of the present invention preferably permit partial memory access operations to be originated in one or more of a variety of ways. First, a master in the data processing system (e.g., a master 232 of an L2 cache 230) may initiate a partial memory access request in response to execution by an affiliated processor core 200 of an explicit "partial" memory access instruction that specifies access to less than all granules of a target cache line of data. Second, a master may initiate a partial memory access request based upon a software hint (e.g., supplied by the compiler) in the object code. Third, a master may initiate a partial memory access request based upon a dynamic detection of memory access patterns by hardware in the data processing system.

Figure 5:
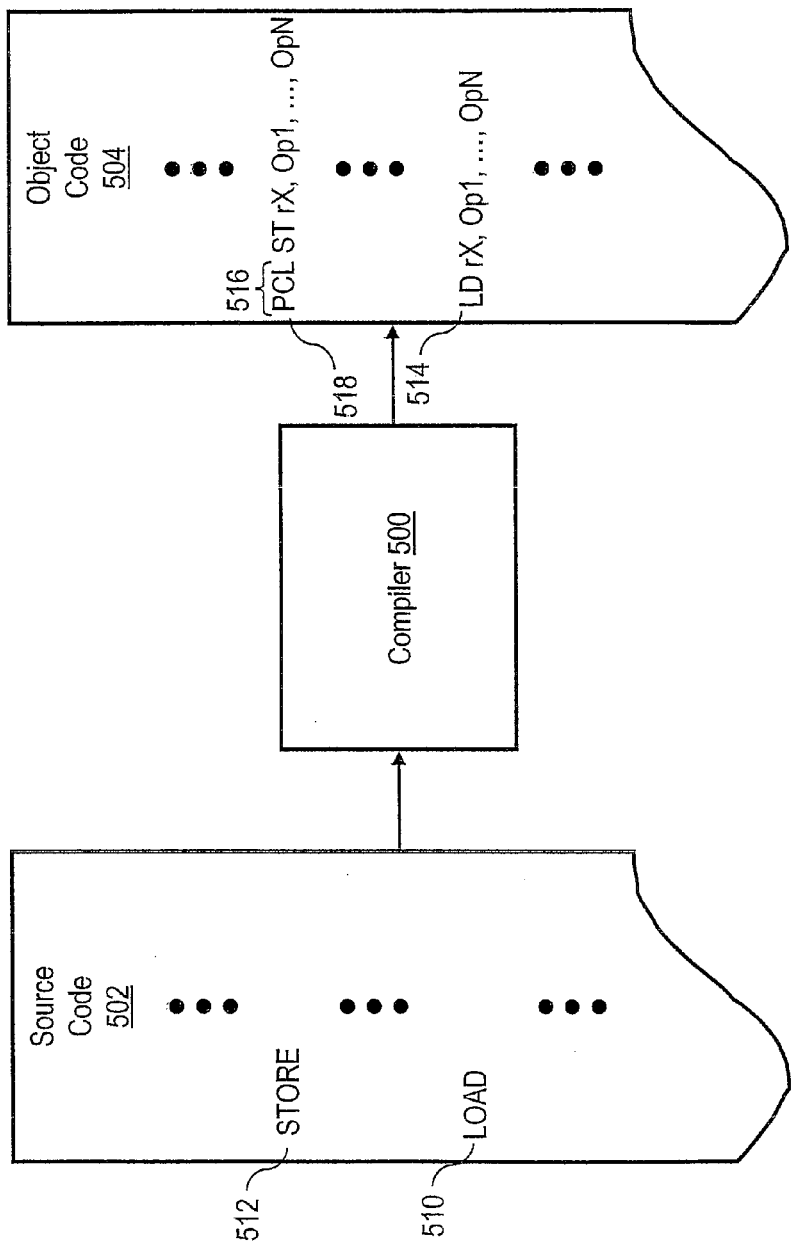
FIG. 5 is a process flow diagram depicting a compiler processing pre-processed code, such as source code, to obtain post-processed code, such as object code, that contains a hint that a store instruction is a partial store instruction targeting less than all granules within a cache line of data.

With reference now to FIG. 5, there is illustrated an exemplary process in accordance with the present invention by which program code is marked with a software hint indicating that a memory access request of an interconnect operation generated in response to execution of a storage-modifying instruction should be a partial memory access request targeting less than all granules of a target cache line of data. In the depicted process, program code, such as compiler 500, executing on a data processing system such as data processing system 100 of FIG. 1, receives pre-processed code, such as source code 502 or intermediate code, and compiles the pre-processed code to obtain post-processed code, such as object code 504.

As indicated, source code 502 includes one or more memory access constructs, such as load instruction 510 and store instruction 512. Load instruction 510 is a non-storage-modifying instruction that specifies data to be loaded from a memory hierarchy by a processor, and store instruction 512 is a storage-modifying instruction that specifies data to be stored into the memory hierarchy by the processor. In response to processing source code 502, compiler 500 generates object code 504 containing a load instruction 514 corresponding to load instruction 510 and a store instruction 518 corresponding to store instruction 512. In the exemplary embodiment, store instruction 512 specifies at least one register identifier (e.g., rX) of an architected register into which data is to be loaded and one or more operands (e.g., Op1-OpN) from which the target memory address of the indicated load operation is to be computed. Generally, operands Op1-OpN can be identified, for example, utilizing register identifier(s), memory address(es), direct specification of an immediate operand, and/or an offset. As shown, store instruction 518 may further include a partial cache line hint 516 provided by compiler 500 in accordance with the process of FIG. 6 that indicates that store instruction 518 targets less than a full cache line of data in the memory hierarchy.

Figure 6:
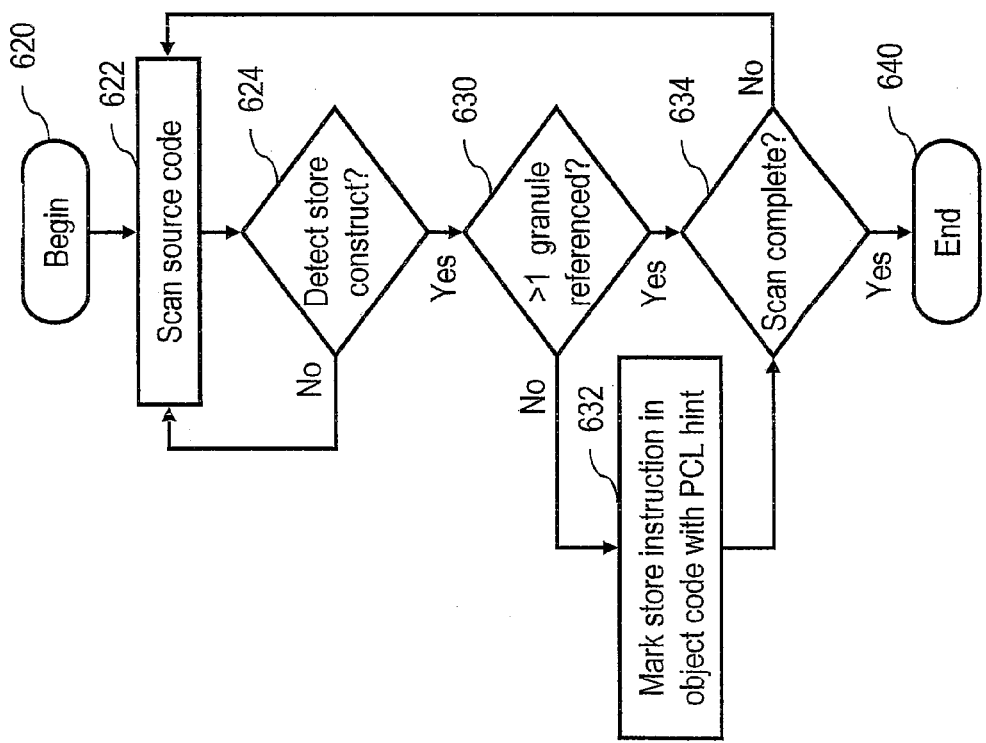
FIG. 6 is a high level logical flowchart illustrating an exemplary method by which a compiler processes pre-processed code to obtain post-processed code according to the process shown in FIG. 5.

Referring now to FIG. 6, there is depicted a high level logical flowchart of an exemplary process by which program code, such as compiler 500, processes pre-processed code, such as source code 502, to obtain post-processed code, such as object code 504, containing hints indicating an amount of data to be stored by a demand store instruction. As with the other logical flowcharts presented herein, the illustrated operations are depicted in a logical rather than chronological order. Consequently, in many cases, certain of the operations shown may be performed concurrently and/or in a different order than that illustrated. The illustrated process can be performed, for example, as part of the code optimization operations of compiler 500.

As shown, the process begins at block 620 and then proceeds to blocks 622-624, which depict compiler 500 scanning source code 502 until a storage-modifying construct, such as a store instruction 512, is detected. A storage-modifying construct is an instruction, command or statement intended to cause a storage-modifying access to be performed in the memory hierarchy of a data processing system. In response to detection of the storage-modifying construct, the process proceeds to block 630, which illustrates compiler 500 determining whether more than one granule 307 of the cache line of data targeted by the storage-modifying construct is subsequently referenced by source code 502, for example, by one or more arithmetic instructions, logical instructions, or memory access instructions (e.g., load instruction 510 or another store instruction). If so, the process passes directly to block 634, which is described below. If, however, compiler 500 determines that at most one granule 307 of the target cache line of the storage-modifying construct is subsequently referenced within close proximity, compiler 500 marks a corresponding store instruction 518 in object code 504 with a partial cache line (PCL) hint 516, which indicates that only a partial cache line should be modified and preferably indicates which granule(s) 307 should be modified. Following block 632, the process proceeds to block 634, which illustrates a determination of whether or not the scan of source code 602 is complete. If so, the process terminates at block 640. If not, the process returns to block 622, which has been described.

Although FIG. 6 depicts an exemplary process in which the resulting object code 504 contains storage-modifying instructions that will either request a full cache line (e.g., 128 bytes) or a single predetermined subset of a full cache line, such as a single granule (e.g., 32 bytes), in other embodiments, compiler 500 may provide partial cache line (PCL) hints for multiple sizes of partial cache lines. In either case, the amount of data stored by storage-modifying instructions in object code 504 is selected responsive the amount of data actually usefully referenced by other instructions in object code 506.

Figure 7:
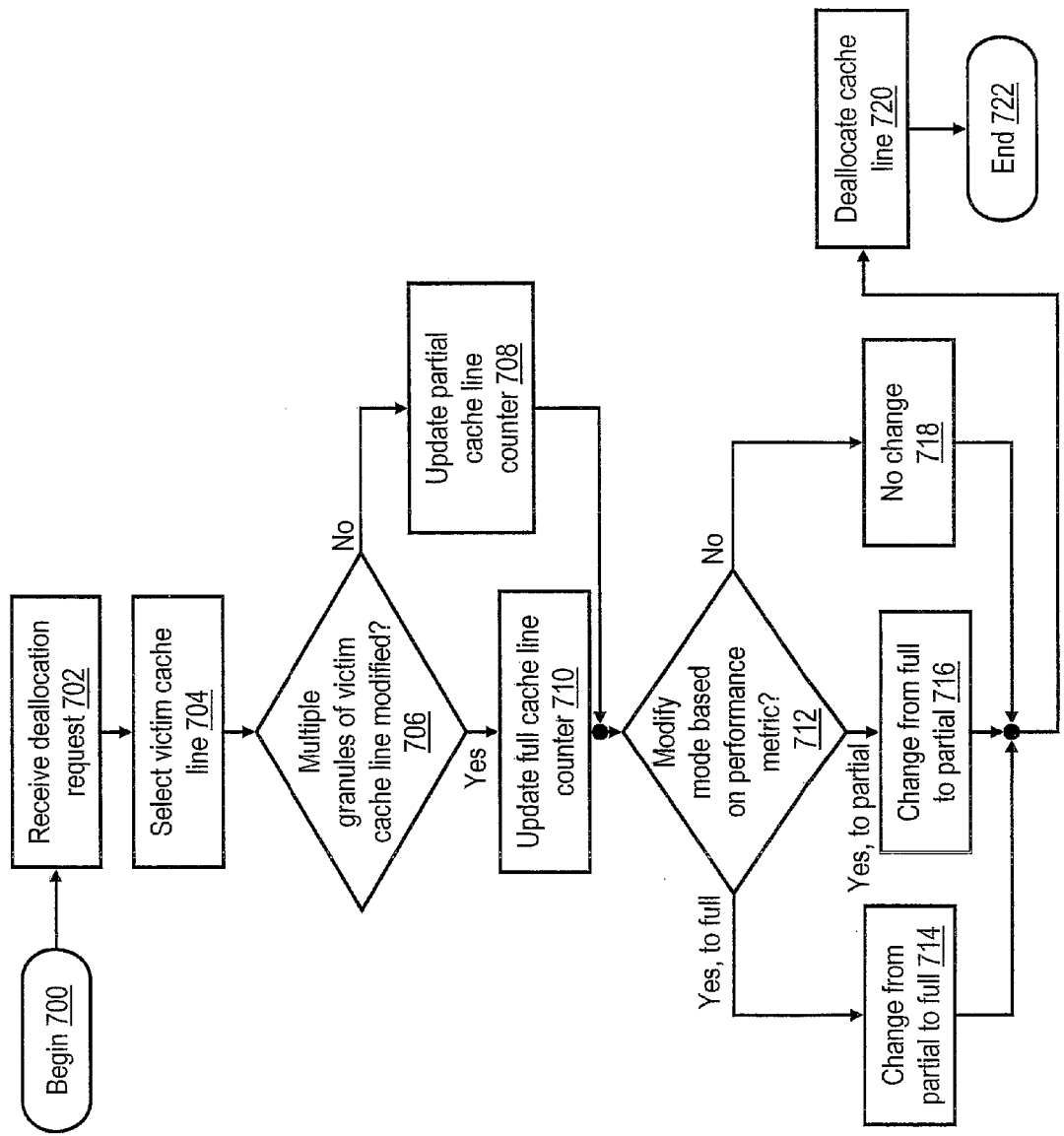
FIG. 7 is a high level logical flowchart depicting exemplary process by which cache hardware transitions between a first mode in which operations target full cache lines and a second mode in which operations target partial cache lines in accordance with an embodiment of the present invention.

Referring now to FIG. 7, there is illustrated a high level logical flowchart of an exemplary process in accordance with the present invention by which hardware in a data processing system dynamically implements partial cache line storage-modifying operations based upon dynamically observed memory access patterns. The process depicted in FIG. 7 may be implemented in the alternative or in addition to the software-based process of FIG. 6.

The process illustrated in FIG. 7 begins at block 700 and proceeds to block 702, which depicts master 232 of an L2 cache 230 receiving a request to deallocate a victim cache line from a specified entry 305 of cache array 301. The deallocation request can be generated by L2 cache 230, for example, in response to a cache miss or in response to execution of a cache line allocation instruction by an affiliated processor core 200. The L2 cache 230 containing master 232 also selects a victim cache line for deallocation according to a least recently used (LRU) algorithm based upon the contents of LRU field 308 (block 714). Of course, any alternative deallocation algorithm may be employed.

In response to selection of the victim cache line, master 232 determines whether or not multiple granules 307 of the victim cache line have been modified while the victim cache line has been resident in cache array 301. In one embodiment, the determination depicted at block 706 is supported by setting the granule coherency state field 314 of each entry 305 to the "Partial" coherency state upon allocation of that entry 305 to a cache line. Master 232 then updates granule coherency state field 314 to a Null state (signifying an absence of coherency information) in response to modification of more than one granule 307 of the cache line in one or more memory accesses. In this embodiment, the determination depicted at block 706 can thus be made simply by examining the contents of the granule coherency state field 314 of the victim cache line to determine if the "Null" state is present.

In response to master 232 determining at block 706 that multiple granules 307 of the victim cache line have been modified while the victim cache line has been resident in cache array 301, the process proceeds to block 710, which depicts master 232 updating a full cache line (FCL) counter 240 (FIG. 2). Alternatively, if master 232 determines at block 706 that only one granule 307 of the victim cache line was modified while the victim cache line was resident in cache array 301, the process passes to block 708, which illustrates master 232 updating a partial cache line (PCL) counter 242 (FIG. 2).

Following either of blocks 708 or 710, the process continues to block 712, which illustrates master 232 determining whether to modify a store mode based on a predetermined performance metric. According to at least some embodiments of the present invention, master 232 computes the performance metric based upon the values of counters 240 and 242, for example, by computing a ratio of the counter values and comparing the ratio to a predetermined threshold. If master 232 determines that the store mode should be modified based upon the performance metric, the process continues to either block 714 (where master 232 updates the store mode changes from partial cache line stores to full cache line stores) or block 716 (where master 232 updates the store mode changes from full cache line stores to partial cache line stores). After block 714 or block 716, the process proceeds to block 720, which is described below. If, on the other hand, master 232 determines that the store mode should not be modified, master 232 makes no changes to the store mode, as shown at block 718, and the process proceeds to block 720.

Block 720 depicts master 232 performing the requested deallocation of the victim cache line. Thereafter, the process ends at block 722.

Figure 8:
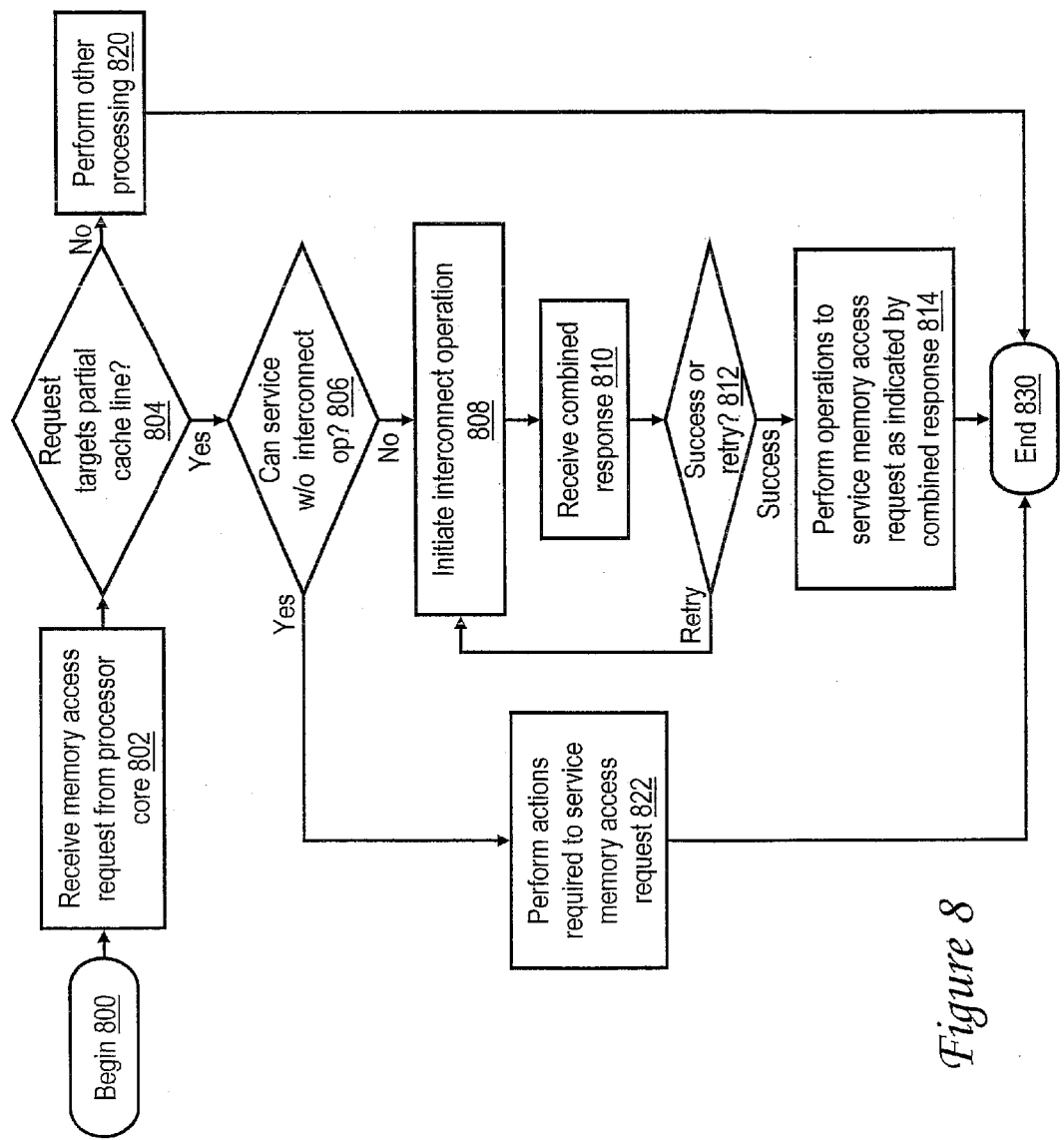
FIG. 8 is a high level logical flowchart illustrating exemplary operation of a cache master according to an embodiment of the present invention.

With reference now to FIG. 8, there is depicted a high level logical flowchart depicting exemplary operation of master 232 of an L2 cache 230 of FIG. 2 in response to receipt of a memory access request from an affiliated processor core 200 in the same processing unit 104. For ease of explanation, it will be assumed hereafter that the possible coherency states that may be assumed by granule coherency state field 314 are the same as those of line coherency state field 306 and that no "Partial" coherency state is implemented.

The process depicted in FIG. 8 begins at block 800 and proceeds to block 802, which illustrates master 232 receiving a memory access request from an affiliated processor core, such as processor core 200*a* of its processing unit 104.

In general, the memory access request received at block 802 belongs to one of two classes of requests: storage-modifying requests, such as store requests and cache block allocation requests, and non-storage-modifying requests such as read requests. The process next proceeds to block 804, which depicts master 232 determining if the memory access request received at block 802 is a partial cache line memory access request. As noted above, in some embodiments, a partial cache line memory access can be initiated in any of at least three ways:

(1) execution by a processor core 200 of an explicit "partial" memory access instruction that specifies a memory access to less than all granules of a target cache line of data, where the processor core 200 communicates a partial cache line signal to L2 cache 230;

(2) execution by a processor core 200 of an instruction having an associated partial cache line (PCL) hint 516, as described above with reference to FIGS. 5 and 6, where the processor core 200 communicates the PCL hint 516 to L2 cache 230; and (3) master 232 dynamically detecting by reference to a prior memory access pattern that a subsequent memory access request received from one of its affiliated processor cores 200 should be restricted to a partial cache line.

If master 232 determines at block 804 that the memory access request received at block 802 is not a partial cache line memory access request, master 232 performs other processing to service the memory access request, as depicted at block 820. Thereafter, the process terminates at block 830.

Returning to block 804, if master 232 determines that the memory access request is a partial cache line memory access request, the process proceeds to block 806. Block 806 illustrates master 232 determining whether the partial cache line memory access request can be serviced without issuing an interconnect operation on interconnect 114 and/or interconnect 110, for example, based upon the request type indicated by the memory access request and the coherency state associated with the target address of the memory access request within line coherency state field 306 and/or granule coherency state field 314 of cache directory 302. For example, as will be appreciated, master 232 generally can satisfy a partial cache line non-storage-modifying request without issuing an interconnect operation if line coherency state field 306 or granule coherency state field 314 indicates any data-valid coherency state for the target granule 307 of the target cache line. Conversely, master 232 generally cannot satisfy a partial cache line storage-modifying request without issuing an interconnect operation unless line coherency state field 306 or granule coherency state field 314 indicates an HPC coherency state for the target granule 307 of the target cache line.

If master 232 determines at block 806 that the memory access request can be serviced without issuing an interconnect operation, the process proceeds to block 822. Block 822 illustrates master 232 performing the actions required to service the partial cache line memory access request. For example, the actions performed at block 822 may include updating or initializing a granule 307 of a cache line in cache array 301 or providing a requested granule of data to processor core 200. As necessary, master 232 also causes an update to be made to the line coherency state field 306 or granule coherency state field 314 associated with the target granule 307. Thereafter, the process terminates at block 830.

Returning to block 806, in response to master 232 determining that the memory access request cannot be serviced without issuing an interconnect operation, the process proceeds to block 808. Block 808 illustrates master 232 issuing an appropriate interconnect operation to enable the memory access request to be serviced. In general, the interconnect operation includes a transaction type, a target address, and a granule identifier that identifies the target granule of the target cache line. In at least some embodiments, the transaction granule identifier may alternatively or additionally be provided separately from the request phase of an interconnect operations, for example, with the combined response and/or at data delivery.

According to an embodiment of the present invention, examples of the interconnect operations that may be initiated by master 232 on interconnect 114 and/or 110 include those set forth in Table II below.

TABLE II

| Request | Description |
|---|---|
| PARTIAL READ | Requests a copy of the image of a granule of a memory block for query purposes |
| PARTIAL STORE | Requests authority to update a granule of a memory block |
| DCLAIM-P (Data Claim Partial) | Requests authority to promote an existing query-only copy of a target granule of a memory block to a unique copy with the intent to update (modify) it and requires destruction of other copies of the target granule, if any |
| READ FULL W/ POSSIBLE PARTIAL | Requests a copy of the image of an entire memory block for query purposes, while permitting the system to provide less than the entire memory block including a specified granule |

Following block 808, the process continues to block 810, which depicts master 232 receiving a combined response 410 from response logic 210 (FIG. 2). As previously discussed, the combined response is generated by response logic 210 from partial responses 406 of snoopers 236 and 222 within data processing system 100 and represents a system wide response to the partial cache line memory access request.

The process continues to block 812, which shows master 232 determining if the combined response 410 includes an indication of a "success" or "retry". If the combined response 410 includes an indication of a "retry" (that the request cannot be fulfilled at the current time and must be retried), the process returns to block 808, which has been described. If the combined response 410 includes an indication of a "success" (that the request can be fulfilled at the current time), the process continues to block 814, which illustrates master 232 performing operations to service the memory access request, as indicated by the combined response 410.

For example, if the request of the interconnect operation was a partial read or a read full with possible partial data, master 232 receives the requested read data from interconnect 114 and supplies the target granule to the requesting processor core 200. In addition, master 232 caches the read data in cache array 301 and updates cache directory 302. If only a single granule of read data is received, master 232 sets granule indicator 312 to identify the target granule 307, sets granule coherency state field 314 to the data-valid coherency state indicated by the combined response 410, and sets line coherency state field 306 to a data-invalid coherency state (e.g., the MESI Invalid state). If a full cache line of data is received (in response to a read full with optional partial data), master 232 sets granule indicator 312 to identify the target granule 307 and sets each of granule coherency state field 314 and line coherency state field 306 to the data-valid coherency state indicated by the combined response 410.

If on the other hand, the memory access request of the interconnect operation was a partial store or a DClaim-P, master 232 updates cache array 301 with the store data provided by the requesting processing unit 200 and updates cache directory 302. In the case of a partial store request, no copy of the memory block initially resided in cache array 301. Consequently, master 232 causes an entry to be allocated to the memory block of the target granule in cache array 301, sets the line coherency state field 306 associated with the new entry 305 to a data-invalid coherency state (e.g., the MESI Invalid state), sets granule indicator 312 to identify the target granule 307, and sets granule coherency state field 314 to an HPC coherency state, as indicated by the combined response 410.

If the interconnect operation was a DClaim-P, a copy of the memory block initially resided in cache array 301. Consequently, master 232 leaves unchanged the line coherency state field 306 associated with the existing entry 305, sets granule indicator 312 to identify the target granule 307, and sets granule coherency state field 314 to an HPC coherency state, as indicated by the combined response 410. For a DClaim-P, combined response 410 may also indicate to master 232 that it is required to issue one or more partial cache line kill operations on interconnect(s) 110, 114 to ensure that all remotely held copies of the target granule 307 are invalidated.

Following block 814, the exemplary process depicted in FIG. 8 terminates at block 830.

Figure 9:
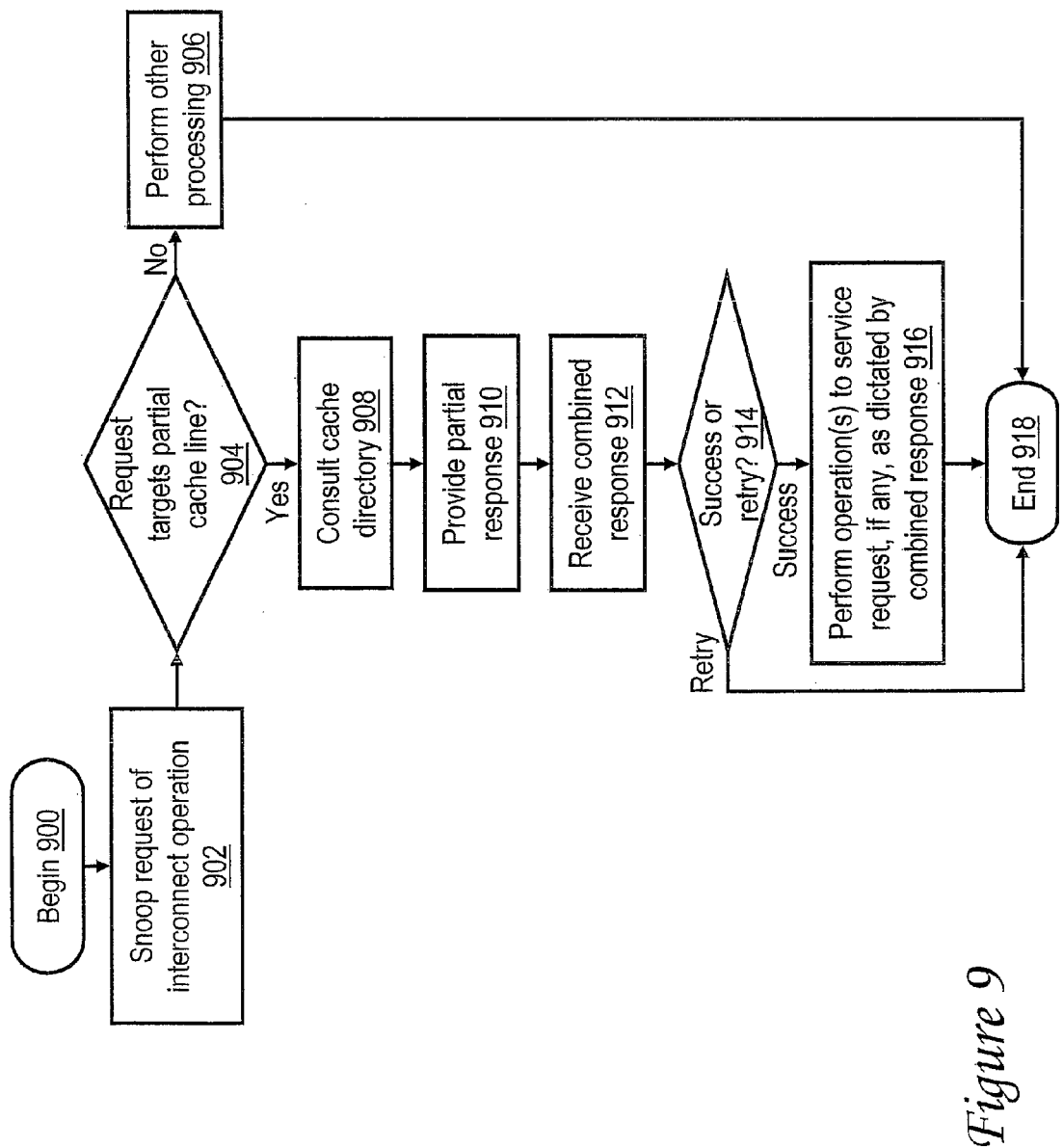
FIG. 9 is a high level logical flowchart illustrating exemplary operation of a cache snooper according to an embodiment of the present invention.

Referring now to FIG. 9, there is depicted is a high level logical flowchart depicting exemplary operation of a snooper 236 of an L2 cache 230 of FIG. 2. The process begins at block 900 and then proceeds to block 902, which illustrates snooper 236 snooping the request of an interconnect operation from interconnect 114 or 110. The process next proceeds to block 904, which depicts snooper 236 determining, for example, based upon the transaction type specified by the request, if the request targets a partial cache line. Examples of such requests are listed in Table II above. If snooper 236 determines at block 904 that the request does not belong to an interconnect operation targeting a partial cache line, the process continues to block 906, which shows snooper 236 performing other processing to handle the snooped request. The process thereafter ends at block 918.

Returning to block 904, if the snooped request targets a partial cache line rather than a full cache line of data, the process continues to block 908. Block 908 illustrates snooper 236 determining whether or not cache directory 302 indicates that cache array 301 holds the target granule in a data-valid coherency state. Based at least partly upon the directory lookup, snooper 236 generates and transmits a partial response 406. The partial response 406 may indicate, for example, the ability of snooper 236 to source requested read data by cache-to-cache data intervention, that the request address missed in cache directory 302, or that snooper 236 will invalidate its local copy of the target granule of a storage-modifying memory access, if required. The process continues to block 912, which illustrates snooper 236 receiving the combined response 410 of the interconnect operation from response logic 210. The process continues to block 914, which shows snooper 236 determining whether the combined response 410 includes an indication of a "success" or "retry". If combined response 410 includes an indication of a "retry" (that the request cannot be serviced at the current time and must be retried), the process simply terminates at block 918, and snooper 236 awaits receipt of the retried request.

If, however, snooper 236 determines at block 914 that the combined response 410 for the snooped partial cache line memory access request includes an indication of "success" (meaning that the request can be serviced at the current time), the process continues to block 916. Block 916 illustrates snooper 236 performing one or more operations, if any, to service the partial cache line memory access request as indicated by the combined response 410.

For example, if the request of the interconnect operation was a partial read or a read full with possible partial data, at least three outcomes are possible. First, the L2 cache 230 of snooper 236 may not hold the target granule in its L2 array and directory 234 in a coherency state from which snooper 236 can source the target granule by cache-to-cache data intervention. In this case, snooper 236 takes no action in response to the combined response 410.

Second, if the request was a partial read and L2 cache 230 of snooper 236 holds the target granule in its L2 array and directory 234 in a coherency state from which snooper 236 can source the target granule by cache-to-cache data intervention, snooper 236 only sources the target granule 307 to the requesting master 232 by cache-to-cache intervention. If the request was a read full with possible partial data, snooper 236 may similarly elect to source only the target granule to the requesting master 232 by cache-to-cache intervention, for example, based upon the coherency state determined at block 908, the presence of another pending request targeting the target same cache line, and/or a software and/or hardware-selectable mode. In this second case, snooper 236 also makes an update to granule coherency state field 314, if required by the selected coherency protocol. For example, snooper 236 may demote the coherency state of its copy of the target granule from an HPC coherency state to a query-only coherency state. The overall coherency state of the cache line reflected in line coherency state field 306 remains unchanged, however, meaning that the other (i.e., non-target) granules of the target cache line may be retained in an HPC coherency state in which they may be modified by the local processing units 200 without issuing an interconnect operation.

Third, if the request was a read full with possible partial data and L2 cache 230 of snooper 236 holds the target granule in its L2 array and directory 234 in a coherency state from which snooper 236 can source the target granule by cache-to-cache data intervention, snooper 236 may elect to source up to the full target cache line of data to the requesting master 232 by cache-to-cache intervention. As noted above, snooper 236 can select the amount of data to source based, for example, upon the coherency state determined at block 908, the presence of another pending request targeting the target same cache line, available bandwidth on one or more of interconnects 110, 114, and/or a software and/or hardware-selectable mode. In this third case, snooper 236 also makes an update to line coherency state field 306, if required by the selected coherency protocol. For example, snooper 236 may demote the coherency state of its copy of the target cache line from an HPC coherency state to a query-only coherency state.

Still referring to block 916, if the request of interconnect operation was a partial store, snooper 236 sources the target granule to the requesting master 232 by cache-to-cache intervention, if indicated by the combined response 410. No intervention data is sourced in response to a DClaim-P. If the lookup of coherency directory 302 at block 908 returned a data-valid coherency state for the target granule of a store partial or DClaim-P request, snooper 236 also updates the coherency state of the target granule in cache directory 302 by setting granule coherency state field 314 to a data-invalid state (e.g., the MESI Invalid state). However, snooper 236 preferably retains unchanged the overall coherency state of the target cache line reflected in line coherency state field 306 so that the other (i.e., non-target) granules of the target cache line can be accessed within L2 cache 230 by the local processing units 200.

In at least some embodiments, if snooper 236 delivers partial data in response to a snooped request, snooper 236 supplies in conjunction with the partial data a granule identifier indicating the position of the target granule 307 in the target cache line Following block 916, the exemplary process depicted in FIG. 9 terminates at block 918.

Figure 10:
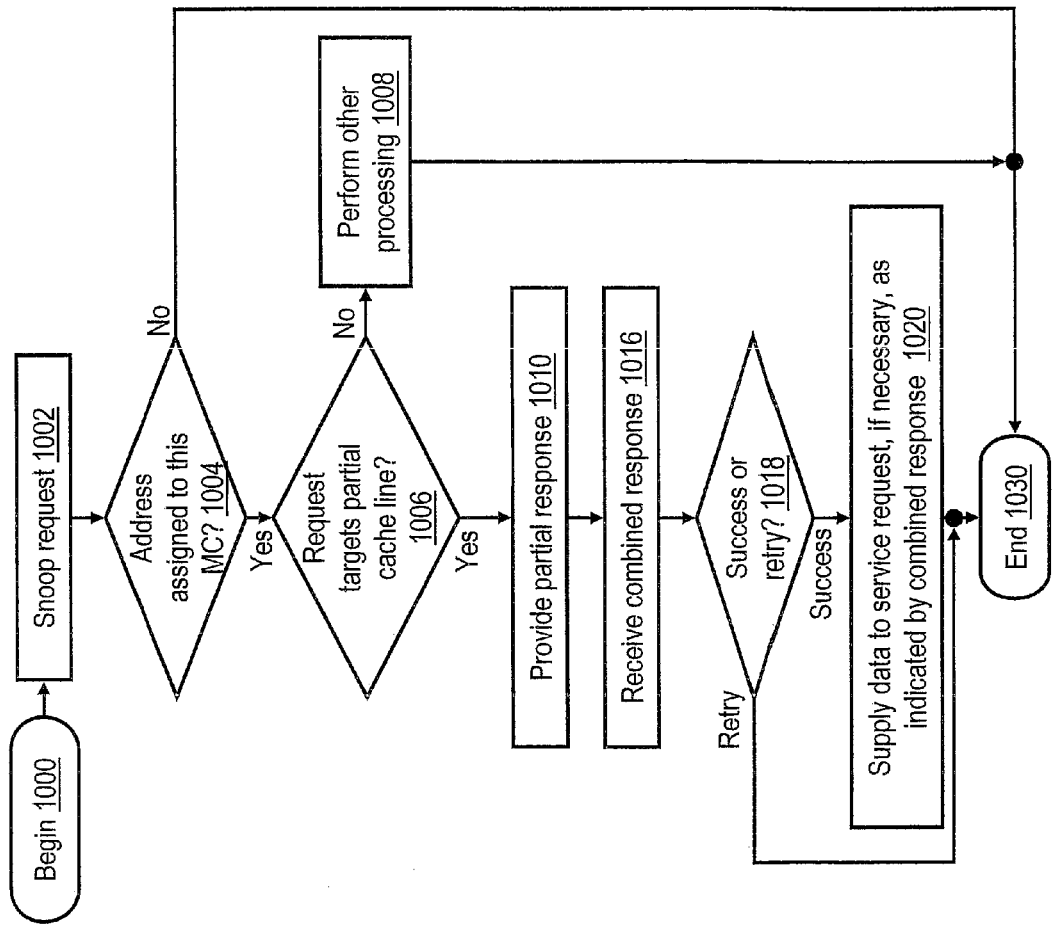
FIG. 10 is a high level logical flowchart depicting exemplary operation of a memory controller snooper according to an embodiment of the present invention.

With reference now to FIG. 10, there is illustrated a high level logical flowchart depicting exemplary operation of snooper 222 within integrated memory controller 206 of FIG. 2. The process begins at block 1000 and proceeds to block 1002, which illustrates snooper 222 snooping a request on one of interconnects 114, 110. The process proceeds to block 1004, which depicts snooper 222 determining if the target address specified by the request is assigned to a system memory 108 controlled by the snooper's integrated memory controller 206. If not, the process terminates at block 1030. If, however, snooper 222 determines at block 1004 that the target address is assigned to a system memory 108 controlled by the snooper's integrated memory controller 206, snooper 222 also determines if the request is a memory access request that targets a partial cache line of data (block 1006). As noted above, examples of such memory access requests are listed in Table II above. If the request is not a memory access request that targets a partial cache line, the process proceeds to block 1008, which depicts snooper 222 performing other processing to service the memory access request. Thereafter, the process terminates at block 1030.

Returning to block 1006, if snooper 222 determines that the request is a memory access request targeting a partial cache line, the process proceeds to block 1010. Block 1010 depicts snooper 222 generating and transmitting a partial response to the memory access request snooped at block 1002. In general, the partial response will indicate "Acknowledge" (i.e., availability to service the memory access request), unless snooper 222 does not have resources available to schedule service of the memory access request within a reasonable interval and thus must indicate "Retry". It should be noted that the use of memory access requests targeting a partial cache line increases the probability of snooper 222 generating an "Acknowledge" partial response in that partial cache line memory accesses utilize less resources (e.g., DRAM banks and data paths) and can be scheduled together with other memory accesses to the same memory block.

The process next passes to block 1016, which illustrates snooper 222 receiving the combined response 410 for the memory access request. As indicated at block 1018, if the combined response 410 includes an indication of "retry", meaning that the request cannot be fulfilled at the current time and must be retried, the process terminates to block 1030. If, however, snooper 222 determines at block 1018 that the combined response 410 includes an indication of a "success", the process continues to block 1020. Block 1020 illustrates snooper 222 supplying one or more memory blocks of data to service the memory access request, if indicated by combined response 410.

For example, if the interconnect operation was a partial read or partial store and combined response 410 indicated that snooper 222 should supply the target granule, snooper 236 sources only the target granule to the requesting master 232. In at least some embodiments, snooper 222 delivers the data in conjunction with a granule identifier indicating the position of the target granule 307 in the target cache line. If the request was a read full with possible partial data, snooper 222 may elect to source only the target granule to the requesting master 232 or may elect to source one or more additional granules of the target cache line. Snooper 222 can determine the amount of data to source, for example, based upon the presence of other cached copies of the target cache line in the system (as indicated by the combined response 410), the presence of one or more other pending request(s) at IMC 206, whether any such pending request(s) target the same target cache line, available interconnect bandwidth, and/or a software and/or hardware-selectable mode.

Following block 1020, the process ends at block 1030.

As has been described, in at least one embodiment, a processor, responsive to a request to modify a granule of a cache line of data containing multiple granules, issues on an interconnect a data claim operation that requests permission to promote the granule to a unique copy with an intent to modify the granule.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a data processing system, it should be understood that the present invention may alternatively be implemented as a program product comprising program code providing a digital representation of the data processing system and/or directing functions of the data processing system. Program code can be delivered to a data processing system via a variety of computer readable media, which include, without limitation, computer readable storage media (e.g., a computer memory, CD-ROM, a floppy diskette, or hard disk drive), and communication media, such as digital and analog networks. It should be understood, therefore, that such computer readable media, when carrying or storing computer readable instructions that direct the functions of the present invention, represent alternative embodiments of the present invention.

What is claimed is:

1. A method of data processing in a multiprocessor data processing system, said method comprising:

the multiprocessor data processing system dynamically determining during execution by reference to a performance metric whether memory access patterns favor partial cache line accesses, wherein the performance metric depends upon a relation between an accumulated number of multiple different first cache lines to which access to a single granule was made while the first cache lines were cached and an accumulated number of multiple different second cache lines to which access to multiple granules was made while the second cache lines were cached;

in response to the determining, the multiprocessor data processing system setting an access mode to a partial cache line access mode in response to determining that memory access patterns favor partial cache line access and otherwise setting the access mode to a full cache line access mode;

in response to a request by a requesting processor core to access a target granule of a target cache line of data containing multiple granules, a processing unit that includes the requesting processor core originating on an interconnect of the multiprocessor data processing system a partial cache line request that requests permission to access only said target granule of the target cache line if the access mode is set to the partial cache line access mode, and otherwise originating on the interconnect a full cache line access request that requests permission to access multiple granules of the target cache line; and in response to a combined response to said partial cache line request indicating success, said combined response representing a system-wide response to said partial cache line request, the processing unit receiving said target granule of the target cache line, supplying the target granule to the requesting processor core, and updating a coherency state of the target granule while retaining a coherency state of at least one other granule of the target cache line.

2. The method of claim 1, and further comprising:

determining whether at least the target granule is resident in a cache of the processing unit in a data-valid coherency state;

wherein said originating comprises originating the partial cache line request in response to determining that the target granule is not resident in the cache in a data-valid coherency state.

3. The method of claim 1, wherein originating said partial cache line request comprises transmitting a granule identifier of the target granule on said interconnect.

4. The method of claim 1, wherein said processing unit is a first processing unit, said method further comprising:

in response to a second processing unit snooping said partial cache line request, said second processing unit transmitting a copy of only said target granule of said target cache line of data to the first processing unit.

5. The method of claim 1, and further comprising:

at the processing unit, identifying the target granule with a granule identifier and indicating the coherency state of the target granule with a granule coherency state field; and separately indicating with a line coherency state field a coherency state of at least one other granule of the target cache line.

6. The method of claim 1, wherein retaining a coherency state of at least one other granule of the target cache line comprises retaining a data-valid coherency state of the at least one other granule of the target cache line.

7. The method of claim 1, wherein dynamically determining whether memory access patterns favor partial cache line accesses comprises dynamically determining whether memory access patterns favor partial cache line accesses in response to deallocation of a cache line from a cache memory of the processing unit.

8. A processing unit for a multiprocessor data processing system, said processing unit comprising:

an interconnect interface supporting connection to an interconnect of the multiprocessor data processing system;

a processor core that executes instructions including memory access instructions; and a cache memory coupled to the processor core, said cache memory including a cache array, a cache directory and a cache controller, wherein the cache controller is configured to perform:

dynamically determining during execution by reference to a performance metric whether memory access patterns favor partial cache line accesses, wherein the performance metric depends upon a relation between an accumulated number of multiple different first cache lines to which access to a single granule was made while the first cache lines were cached and an accumulated number of multiple different second cache lines to which access to multiple granules was made while the second cache lines were cached;

in response to the determining, setting an access mode to a partial cache line access mode in response to determining that memory access patterns favor partial cache line access and otherwise setting the access mode to a full cache line access mode;

in response to a request by the processor core to access a target granule of a target cache line of data containing multiple granules, originating on the interconnect a partial cache line request that requests permission to access only said target granule of the target cache line if the access mode is set to the partial cache line access mode, and otherwise originating on the interconnect a full cache line access request that requests permission to access multiple granules of the target cache line; and in response to a combined response to said partial access request indicating success, said combined response representing a system-wide response to said partial cache line request, receiving said target granule of the target cache line, supplying the target granule to the processor core, and updating a coherency state of the target granule while retaining a coherency state of at least one other granule of the target cache line.

9. The processing unit of claim 8, wherein said cache controller originates the partial cache line request in response to determining that the target granule is not resident in the cache array in a data-valid coherency state.

10. The processing unit of claim 8, wherein said cache controller transmits a granule identifier of the target granule on said interconnect.

11. The processing unit of claim 8, wherein the cache memory includes:
a granule identifier identifying the target granule;
a granule coherency state field indicating the coherency state of the target granule; and
a line coherency state field separately indicating a coherency state of at least one other granule of the target cache line.

12. The processing unit of claim 8, wherein retaining a coherency state of at least one other granule of the target cache line comprises retaining a data-valid coherency state of the at least one other granule of the target cache line.

13. The processing unit of claim 8, wherein dynamically determining whether memory access patterns favor partial cache line accesses comprises dynamically determining whether memory access patterns favor partial cache line accesses in response to deallocation of a cache line from the cache memory of the processing unit.

14. A multiprocessor data processing system, comprising:
an interconnect; and
at least first and second processing units coupled to the interconnect, said first processing unit including a processor core and a cache memory including a cache array, a cache directory and a cache controller, wherein the cache controller is configured to perform:

dynamically determining during execution by reference to a performance metric whether memory access patterns favor partial cache line accesses, wherein the performance metric depends upon a relation between an accumulated number of multiple different first cache lines to which access to a single granule was made while the first cache lines were cached and an accumulated number of multiple different second cache lines to which access to multiple granules was made while the second cache lines were cached;

in response to the determining, setting an access mode to a partial cache line access mode in response to determining that memory access patterns favor partial cache line access and otherwise setting the access mode to a full cache line access mode;

in response to a processor request to access a target granule of a target cache line of data containing multiple granules, originating on the interconnect a partial cache line request that requests permission to access only said target granule of the target cache line if the access mode is set to the partial cache line access mode, and otherwise originating on the interconnect a full cache line access request that requests permission to access multiple granules of the target cache line; and in response to a combined response to said partial cache line request indicating success, said combined response representing a system-wide response to said partial cache line request, receiving said target granule of the target cache line, supplying the target granule to the processor core, and updating a coherency state of the target granule while retaining a coherency state of at least one other granule of the target cache line.

15. The multiprocessor data processing system of claim 14, wherein said cache controller originates the partial cache line request in response to determining that the target granule is not resident in the cache array in a data-valid coherency state.

16. The multiprocessor data processing system of claim 14, wherein said cache controller transmits a granule identifier of the target granule on said interconnect.

17. The multiprocessor data processing system of claim 14, wherein said cache memory includes:
a granule identifier identifying the target granule;
a granule coherency state field indicating the coherency state of the target granule; and
a line coherency state field separately indicating a coherency state of at least one other granule of the target cache line.

18. The multiprocessor data processing system of claim 14, wherein the second processing unit, in response to snooping said partial cache line request, transmits a copy of only said target granule of said target cache line of data to the first processing unit.

19. The data processing system of claim 14, wherein retaining a coherency state of at least one other granule of the target cache line comprises retaining a data-valid coherency state of the at least one other granule of the target cache line.

20. The data processing system of claim 14, wherein dynamically determining whether memory access patterns favor partial cache line accesses comprises dynamically determining whether memory access patterns favor partial cache line accesses in response to deallocation of a cache line from the cache memory of the first processing unit.

* * * * *